US012739827B2

(12) United States Patent
Liu

(10) Patent No.: US 12,739,827 B2
(45) Date of Patent: Sep. 15, 2026

(54) UPLINK TRANSMISSION METHOD AND APPARATUS, DEVICE, AND READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 18/575,781

(22) PCT Filed: Jun. 29, 2021

(86) PCT No.: PCT/CN2021/103243

§ 371 (c)(1),
(2) Date: Dec. 29, 2023

(87) PCT Pub. No.: WO2023/272514

PCT Pub. Date: Jan. 5, 2023

(65) Prior Publication Data

US 2025/0089041 A1 Mar. 13, 2025

(51) Int. Cl.
*H04W 72/1268* (2023.01)
*H04B 7/06* (2006.01)
(Continued)

(52) U.S. Cl.
CPC ...... *H04W 72/1268* (2013.01); *H04B 7/0639* (2013.01); *H04L 5/0051* (2013.01); *H04W 72/51* (2023.01); *H04W 74/0816* (2013.01)

(58) Field of Classification Search
CPC ............. H04W 72/1268; H04W 72/51; H04W 74/0816; H04B 7/0639; H04B 7/0456; H04L 5/0051; H04L 1/08
See application file for complete search history.

(56) References Cited

U.S. PATENT DOCUMENTS 12,225,524 B2 * 2/2025 Xu ........................ H04W 72/23
2021/0168839 A1 * 6/2021 Su ........................ H04B 7/0456
(Continued)

FOREIGN PATENT DOCUMENTS

CN 110838856 A 2/2020
CN 110858775 A * 3/2020 ........... H04L 5/0048
(Continued)

OTHER PUBLICATIONS

International Search Report of PCT/CN2021/103243 dated Feb. 8, 2022, (6p).

(Continued)

*Primary Examiner* — Sujoy K Kundu
*Assistant Examiner* — Vladislav Y Agureyev
(74) *Attorney, Agent, or Firm* — Arch & Lake LLP; Hao Tan; Shen Wang

(57) ABSTRACT

The present disclosure relates to the field of communications, and provides an uplink transmission method and apparatus, a device, and a readable storage medium. The method includes: receiving configuration signaling, the configuration signaling comprising a first indication field, and the first indication field being used for indicating precoding matrix indicator information, i.e., TPMI indication information when a terminal sends codebook-based uplink transmission of a physical uplink shared channel (PUSCH); and determining, on the basis of the TPMI indication information, precoding used when the PUSCH is sent, wherein the terminal reports whether to support the capability of a second TPMI indication field.

19 Claims, 3 Drawing Sheets receiving configuration signaling, wherein the configuration signaling comprises a first indication field, the first indication field is used to indicate TPMI indication information when the terminal transmits codebook-based uplink transmission of PUSCH — 201 determining a precoding used when the PUSCH is transmitted based on the TPMI indication information — 202

(51) Int. Cl.
*H04L 5/00* (2006.01)
*H04W 72/51* (2023.01)
*H04W 74/0816* (2024.01)

(56) References Cited

U.S. PATENT DOCUMENTS

2021/0250206 A1* 8/2021 Liu ..................... H04L 25/0226
2021/0360594 A1* 11/2021 Park ................... H04B 7/06952
2021/0410181 A1* 12/2021 Jeon .................. H04W 52/0258
2022/0038244 A1* 2/2022 Zhang ............... H04W 72/0446
2022/0046661 A1* 2/2022 Jeon ...................... H04W 72/23
2022/0046750 A1* 2/2022 Jeon ...................... H04W 36/06
2022/0053526 A1* 2/2022 Kang .................... H04L 5/0044
2022/0159593 A1* 5/2022 Jeon ...................... H04W 76/30
2022/0174724 A1* 6/2022 Babaei .............. H04W 72/0446
2022/0345195 A1* 10/2022 Jang ..................... H04B 7/0695
2022/0346028 A1* 10/2022 Cirik ................... H04W 52/146
2023/0033910 A1* 2/2023 Khoshnevisan ...... H04L 5/0048
2023/0069053 A1* 3/2023 Yuan ................. H04W 72/0446
2023/0156680 A1* 5/2023 Huang .................. H04L 5/0044
370/329
2023/0180134 A1* 6/2023 Liu ..................... H04W 52/242
455/522
2023/0209567 A1* 6/2023 Grossmann ........... H04L 5/0051
370/329
2023/0309089 A1* 9/2023 Kim ...................... H04L 5/0023
2023/0327819 A1* 10/2023 Fang .................. H04B 7/06952
370/329
2023/0328726 A1* 10/2023 Shi ........................ H04L 5/0094
370/329
2023/0344585 A1* 10/2023 Liu ..................... H04W 52/146
2023/0362927 A1* 11/2023 Sun ...................... H04B 7/0456
2024/0049221 A1* 2/2024 Chen ..................... H04L 5/0035
2024/0147466 A1* 5/2024 Zhang ................... H04L 5/0053
2024/0235788 A1* 7/2024 Huang .................. H04L 1/0046
2024/0237024 A9* 7/2024 Sun ....................... H04L 5/0048
2025/0212016 A1* 6/2025 Liu ........................ H04B 7/022
2025/0373381 A1* 12/2025 Liu ....................... H04L 5/0044
2025/0392420 A1* 12/2025 Liu ........................ H04B 7/024

FOREIGN PATENT DOCUMENTS

CN 111082905 A * 4/2020 ............ H04W 72/23
CN 112788591 A 5/2021
CN 112913166 A 6/2021
CN 113824481 A * 12/2021 ............ H04W 72/21
CN 114765879 A * 7/2022 ............ H04W 72/23
CN 114915393 A * 8/2022 ............ H04W 72/23
CN 115023989 A * 9/2022 ............ H04W 72/21
CN 115278716 A * 11/2022 ........... H04L 5/0035
CN 115333702 A * 11/2022 ........... H04L 1/0072
CN 115380578 A * 11/2022 .......... H04W 52/146
CN 115989704 A * 4/2023 ............ H04W 72/04
CN 116114344 A * 5/2023 ........... H04L 5/0048
CN 116438771 A * 7/2023 ........... H04B 7/0404
CN 121400042 A * 1/2026 ............ H04W 72/21
CN 121511645 A * 2/2026 ............ H04W 72/04
EP 3641452 A1 4/2020
EP 4020831 A1 * 6/2022 ............ H04W 72/23
WO WO-2022133727 A1 * 6/2022 ............ H04W 72/04
WO WO-2022183347 A1 * 9/2022 ............ H04W 72/04
WO WO-2022227052 A1 * 11/2022 .......... H04W 52/146

OTHER PUBLICATIONS

Source: Vivo, Enhancements on Multi-TRP for PDCCH, PUCCH and PUSCH(R1-2100422),3GPP TSG RAN WG1 #104-e R1-2100422, Jan. 25-Feb. 5, 2021, (28p).
Source: CATT, Enhancements on multi-TRP/panel for PDCCH, PUCCH and PUSCH(R1-2100344), 3GPP TSG RAN WG1 Meeting #104-e R1-2100344, Jan. 25-Feb. 5, 2021, (17p).
Source: Huawei, HiSilicon, Enhancements on multi-TRP for reliability and robustness in Rel-17(R1-2100209), 3GPP TSG RAN WG1 Meeting #104-e R1-2100209, Jan. 25-Feb. 5, 2021, (13p).
Notice of Allowance of Chinese Application No. 202180002081.7 dated Apr. 3, 2025 with English translation, (5p).

* cited by examiner

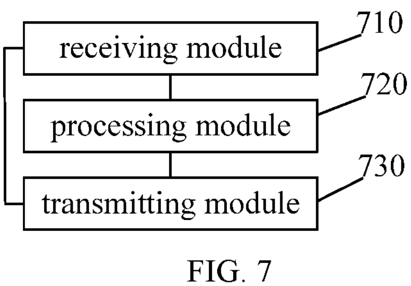
FIG. 7
processing module
820
transmitting module
810
receiving module
830
FIG. 8
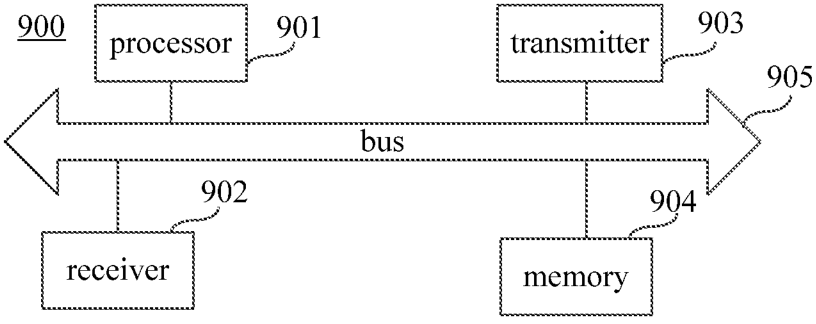
FIG. 9

UPLINK TRANSMISSION METHOD AND APPARATUS, DEVICE, AND READABLE STORAGE MEDIUM

The present application is a U.S. National Stage of International Application No. PCT/CN2021/103243, filed on Jun. 29, 2021, the contents of all of which are incorporated herein by reference in their entireties for all purposes.

TECHNICAL FIELD

The present disclosure relates to the field of communications, and in particular to an uplink transmission method, apparatus, device, and readable storage medium.

BACKGROUND

In the New Radio (NR), as for the multi-TRP enhancement solution, the codebook-based Physical Uplink Shared Channel (PUSCH) transmission is proposed, and two Transmitted Precoding Matrix Indicator (TPMI) domains and two SRS Resource Indicator (SRI) domains are introduced.

The first SRI domain indicates that the corresponding SRS resources are used for transmission in the first TRP direction, and the transmission uses the precoding manner indicated by the first TPMI domain. The second SRI domain indicates that the corresponding SRS resources are used for transmission in the second TRP direction, and the transmission uses the precoding manner indicated by the second TPMI domain.

SUMMARY

Embodiments of the present disclosure provide an uplink transmission method, apparatus, device, and readable storage medium. The technical solutions are as follows.

According to one aspect of the present disclosure, there is provided an uplink transmission method, applied to a terminal, and the method including:

- receiving configuration signaling, wherein the configuration signaling includes a first indication field, the first indication field indicates precoding matrix indicator (TPMI indication information) while the terminal transmits codebook-based uplink transmission of a physical uplink shared channel (PUSCH); and
- determining a precoding used while the PUSCH is transmitted, based on the TPMI indication information.

According to another aspect of the present disclosure, there is provided an uplink transmission method, applied to a network device, and the method including:

- transmitting configuration signaling to a terminal, wherein the configuration signaling includes a first indication field, the first indication field indicates precoding matrix indicator (TPMI indication information) while the terminal transmits codebook-based uplink transmission of a physical uplink shared channel (PUSCH); and
- determining a precoding used while the PUSCH is received, based on the TPMI indication information.

According to another aspect of the present disclosure, there is provided an uplink transmission apparatus, applied to a terminal, and the apparatus including:

- a receiving module, configured to receive configuration signaling, wherein the configuration signaling includes a first indication field, the first indication field indicates precoding matrix indicator (TPMI indication information) while the terminal transmits codebook-based uplink transmission of a physical uplink shared channel (PUSCH); and
- a processing module, configured to determine a precoding used while the PUSCH is transmitted, based on the TPMI indication information.

According to another aspect of the present disclosure, there is provided an uplink transmission apparatus, applied to network device, and the apparatus including:

- a transmitting module, configured to transmit configuration signaling to a terminal, wherein the configuration signaling includes a first indication field, the first indication field indicates precoding matrix indicator (TPMI indication information) while the terminal transmits codebook-based uplink transmission of a physical uplink shared channel (PUSCH); and
- a processing module, configured to determine a precoding used while the PUSCH is received, based on the TPMI indication information.

According to another aspect of the present disclosure, there is provided a terminal device, including:

- a processor; and
- a transceiver, connected with the processor,
- wherein, the processor is configured to load and execute executable instructions to implement the uplink transmission methods as described in embodiments of the present disclosure above.

According to another aspect of the present disclosure, there is provided a network device, including:

- a processor; and
- a transceiver, connected with the processor,
- wherein, the processor is configured to load and execute executable instructions to implement the uplink transmission methods as described in embodiments of the present disclosure above.

According to another aspect of the present disclosure, there is provided a non-transient computer-readable storage medium, having at least one instruction, at least one program, code set or instruction set stored therein, wherein the at least one instruction, at least one program, code set or instruction set is loaded and executed by a processor to implement the uplink transmission methods as described in embodiments of the present disclosure above.

BRIEF DESCRIPTION OF THE DRAWINGS

In order to more clearly illustrate the technical solutions in the embodiments of the present disclosure, the drawings needed to be used in the description of the embodiments will be briefly introduced below. The drawings in the following description are only some embodiments of the present disclosure. For those of ordinary skill in the art, other drawings can also be obtained based on these drawings without paying for creative efforts.

FIG. 7 shows a structural block diagram of an uplink transmission apparatus provided by an example embodiment of the present disclosure;

FIG. 8 shows a structural block diagram of an uplink transmission apparatus provided by another example embodiment of the present disclosure; and FIG. 9 is a structural block diagram of a communication device according to an example embodiment of the present disclosure.

DETAILED DESCRIPTION

In order to make the purpose, technical solutions and advantages of the present disclosure clearer, the embodiments of the present disclosure will be described in further detail below in conjunction with the accompanying drawings.

Figure 1:
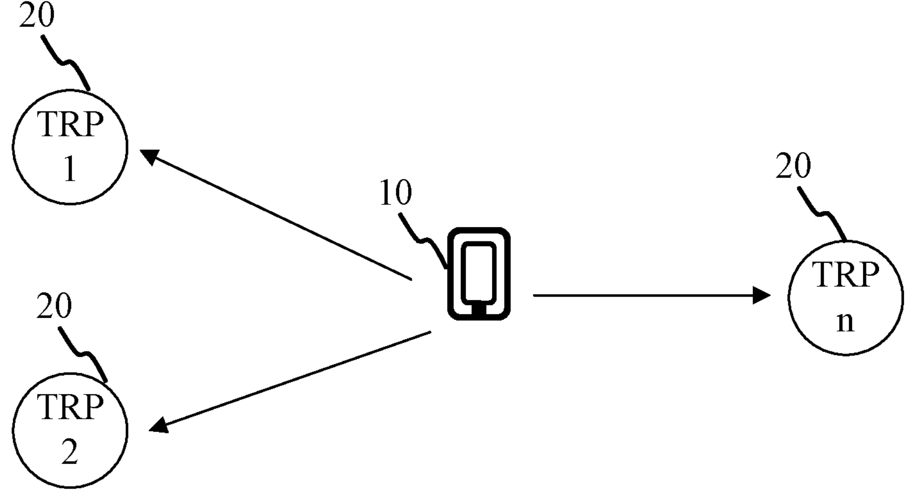
FIG. 1 shows a block diagram of a communication system provided by an example embodiment of the present disclosure.

Please refer to FIG. 1, which shows a schematic diagram of a communication system provided by an embodiment of the present application. The communication system may include a terminal device 10 and a network device.

The number of terminal devices 10 is usually plural, and one or more terminal devices 10 may be distributed in a cell managed by each network device. The terminal device 10 may include various handheld devices with wireless communication functions, vehicle-mounted devices, wearable devices, computing devices or other processing devices connected to wireless modems, as well as various forms of User Equipment (UE), Mobile Stations (MS) and so on. For convenience of description, in the embodiments of this application, the above-mentioned devices are collectively referred to as terminal devices.

The network device is an apparatus deployed in the access network to provide wireless communication functions for the terminal device 10. The network device can include various forms of macro base stations, micro base stations, relay stations, access points, etc. In systems using different wireless access technologies, the names of devices with network device functions may be different. For example, in 5G NR systems, they are called gNodeB or gNB. As communications technology evolves, the name "network device" may change. For convenience of description, in the embodiment of the present application, the above-mentioned apparatuses that provide wireless communication functions for the terminal device 10 are collectively referred to as network devices. In one example, the network device and the terminal device 10 communicate with each other through some air interface technology, such as the Uu interface.

In one example, a network device can be deployed with a plurality of TRPs. For example, as shown in FIG. 1, the network device correspondingly has TRP1, TRP2 . . . TRPn (the TRPs are numbered 20 in FIG. 1). The terminal device can use different transmission beams to transmit uplink channels (such as PUSCH) in different TRPs, and the network device can receive the uplink channels (such as PUSCH) transmitted by the terminal device through a plurality of TRPs. For example, since different TRPs have different relative orientations to the terminal device, the terminal device needs to use transmission beams in different beam directions, to transmit uplink channels (such as PUSCH) to the TRPs in corresponding directions.

The "5G NR system" in the embodiments of this disclosure may also be called a 5G system or an NR system, but those skilled in the art can understand its meaning. The technical solutions described in the embodiments of this disclosure may be applied to the 5G NR system, and may also be applied to subsequent evolution systems of the 5G NR system.

The technical solutions of embodiments of the present disclosure can be applied to various communication systems, such as: Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced long Term Evolution (LTE-A) system, New Radio (NR) system, evolution system of NR system, LTE-based access to Unlicensed spectrum (LTE-U) system, NR-U system, Universal Mobile Telecommunication System (UMTS), Worldwide Interoperability for Microwave Access (WiMAX) communication system, Wireless Local Area Networks (WLAN), Wireless Fidelity (WiFi), next-generation communication systems or other communication systems, etc.

The 3GPP introduces cooperative transmission technology based on multiple TRPs in the 5G NR system. The application of multiple TRP/Panel (antenna panels) in the network device is mainly to improve coverage at the cell edge, provide a more balanced service quality within the service area, and use different manners to cooperatively transmit data among multiple TRP/Panels. From the perspective of network form, network deployment with a large number of distributed access points and centralized baseband processing will be more conducive to providing a balanced user experience rate, and significantly reduce the delay and signaling overhead caused by handover. Utilizing the cooperation between multiple TRPs/Panels to transmit/receive channels from multiple beams in multiple directions can better overcome various occlusion/blocking effects and ensure the robustness of link connections, which is suitable for URLLC (Ultra Reliable Low Latency Communication) service to improve transmission quality and meet reliability requirements.

In the R16 (Release 16) research stage, the application of cooperative transmission technology based on multiple TRPs mainly enhances the transmission of PDSCH (Physical Downlink Shared Channel). Since data transmission includes scheduling feedback of uplink and downlink channels, in the research of URLLC, only enhancing the downlink data channel cannot guarantee service performance. Therefore, discussions in R17 continue to enhance Physical Downlink Control Channel (PDCCH), Physical Uplink Control Channel (PUCCH), and Physical Uplink Shared Channel (PUSCH).

The uplink transmission scheme of PUSCH includes: 1. uplink transmission based on codebook; 2. data transmission based on non-codebook. The two uplink transmission schemes will be described separately.

1. Uplink Transmission Based on Codebook

In the NR system, the access network device can configure at most one SRS resource set for the terminal for codebook-based uplink transmission. This is achieved by configuring one SRS resource set as "codebook".

When the access network device schedules PUSCH through the Downlink Control Information (DCI) format 0_1, and the access network device configures two codebook-based uplink transmission SRS resources for the terminal, the terminal determines the precoding and number of transmission streams for PUSCH according to indication of the SRS Resource Indicator (SRI) and Transmitted Precoding Matrix Indicator (TPMI)/Transmitted Rank Indicator (TRI), and the data stream is mapped to the port of the SRS resource indicated by the SRI for transmission through the determined precoding.

When the base station configures a plurality of SRS resources for codebook-based uplink transmission for the terminal, and an SRI indication domain exists, an SRI indication domain is used to indicate that the base station has configured which SRS resource among the plurality of SRS resources for codebook-based uplink transmission for the terminal. When the base station schedules PUSCH through DCI format 0_1, and the base station only configures one SRS resource for codebook-based uplink transmission for the terminal, no SRI indication exists.

The data in the uplink transmission of the terminal needs to be precoded using the Precoding Matrix Indicator (PMI) and stream number indicator information (Rank Indicator, RI) specified by the network side. At the same time, the precoded data is mapped to the corresponding antenna port according to the spatial filter (SpatialRelationInfo) corresponding to the SRS resource indicated by the SRI.

For example, Table 1 shows the indication manner of a plurality of SRS resources corresponding to SRI.

TABLE 1

| Bit field mapped to index | SRI(s), $N_{SRS} = 2$ |
|---|---|
| 0 | 0 |
| 1 | 1 |

According to Table 1, when the specified bit of DCI has a value of 0, the SRI domain corresponding to this bit is used to indicate the use of the 0th SRS resource. Correspondingly, when the specified bit of DCI has a value of 1, the SRI domain corresponding to this bit is used to indicate the use of the first SRS resource.

Table 2 shows the signaling indication manner for single-layer transmission of TPMI and RI with 4 antenna ports as an example, respectively targeting different UE capabilities. The UE capabilities include three categories: fully relevant, partially relevant and irrelevant.

TABLE 2

| Bit field mapped to index | fully relevant | Bit field mapped to index | partially relevant | Bit field mapped to index | irrelevant |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | | . . . | | 2 | 1 layer: TPMI = 2 |
| 11 | 1 layer: TPMI = 11 | 11 | 1 layer: TPMI = 11 | 3 | 1 layer: TPMI = 3 |
| 12 | 1 layer: TPMI = 12 | 12-15 | Reserved | | |
| . . . | | | | | |
| 27 | 1 layer: TPMI = 27 | | | | |
| 28-31 | Reserved | | | | |

The codebook subset corresponding to the irrelevant type is all the precoding codewords in the codebook that corresponding any data stream is transmitted only through one antenna port. The codebook subset corresponding to the partially relevant type is all the codewords in the codebook that meet the following conditions: precoding codewords transmitted by any data stream through an antenna port, or the first and third ports, or the second and fourth ports. The codebook subset corresponding to the fully relevant type is all codewords in the codebook.

For example, according to Table 2, it can be seen that taking the fully relevant type as an example, when the bit value is 0, the corresponding expression transmission layer number is 1 layer, and the TPMI information corresponding to the corresponding TPMI domain indicates to use the 0th precoding matrix in the codebook for precoding.

Table 3 shows the form of the codebook.

TABLE 3

| TPMI index | codeword (the order increases from left to right corresponding to TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

2. Uplink Transmission Based on Non-Codebook

In the NR system, the base station can configure at most one SRS resource set for the terminal for non-codebook based uplink transmission. This is achieved by configuring one SRS resource set as "non-codebook".

For non-codebook based uplink transmission, the terminal transmits a maximum number of SRS resources that can be transmitted simultaneously to the base station. This resource set can be configured with at most 4 SRS resources, and each SRS resource contains one SRS port. The base station can indicate one or more SRS resources to the terminal through SRI for determining PUSCH precoding. The number of SRS resources corresponding to the SRI is the number of streams of PUSCH transmission. When the base station configures only one SRS resource for the terminal for non-codebook uplink transmission, DCI format 0_1 does not contain SRI, and the terminal determines the precoding of PUSCH based on the configured SRS resource.

In the current R17 discussion, as for multi-TRP enhancement, codebook-based PUSCH transmission introduces two TPMI domains and two SRI domains. When two SRS resource sets are configured, PUSCH uses the first SRI domain to indicate that the corresponding SRS resource is used for transmission in the first TRP direction. The specific precoding and number of layers used for transmission are indicated by the first TPMI domain. PUSCH uses the second SRI domain to indicate that the corresponding SRS resource is used for transmission in second TRP direction. The specific precoding and number of layers used for transmission are indicated by the second TPMI domain.

However, this solution results in high DCI signaling overhead and reduces DCI demodulation performance in multi-TRP scenarios.

Figure 2:
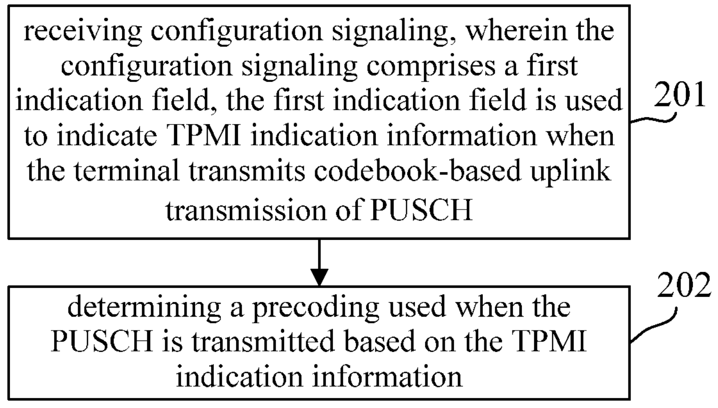
FIG. 2 shows a flow chart of an uplink transmission method provided by an example embodiment of the present disclosure.

The present disclosure provides an uplink transmission method. Please refer to FIG. 2, which shows a flow chart of an uplink transmission method provided by an example embodiment of the present disclosure. Taking this method applied to a terminal as an example, as shown in FIG. 2, the method includes following steps.

Step 201, configuration signaling is received, wherein the configuration signaling includes a first indication field, the first indication field indicates TPMI indication information while the terminal transmits codebook-based uplink transmission of PUSCH.

In some embodiments, the field used to indicate the TPMI indication domain in the configuration signaling only includes the first indication field. In some embodiments, the configuration signaling includes any one of physical layer signaling, Radio Resource Control (RRC) signaling, and Media Access Control Element (MAC CE). In this embodiment, for example, the configuration signaling is implemented as RRC signaling.

Optionally, the first indication field indicates TPMI indication information while the terminal transmits codebook-based uplink transmission of PUSCH in one or at least two TRPs. In some embodiments, the TPMI indication information is used to indicate that the terminal configures the second TPMI domain during codebook-based uplink transmission; or, the TPMI indication information is used to indicate that the terminal does not have the ability to configure the second TPMI domain during codebook-based uplink transmission.

In some embodiments, the configuration signaling is directly configured by the network device to the terminal. That is, regardless of whether the terminal has the UE capability to support the second TPMI domain, the network device can transmit configuration information to the terminal, and the terminal is configured to determine to transmit precoding through the configured TPMI domain when transmitting based on the codebook.

Alternatively, after receiving the UE capabilities reported by the terminal device, the network device transmits the configuration signaling to the terminal according to the UE capabilities. That is, the terminal first transmits UE capability related information to the network device. The UE capability related information is used to indicate whether the terminal supports an ability to configure a second TPMI indication domain in downlink control information (DCI) while the terminal supports cooperation of at least two TRPs to transmit the PUSCH, so that the network device transmits configuration signaling to the terminal according to the UE capability related information.

Step 202, a precoding used while the PUSCH is transmitted is determined based on the TPMI indication information.

In some embodiments, the precoding used while the PUSCH is transmitted towards a TRP direction is determined based on the TPMI indication information; or, the precoding used while the PUSCH is transmitted towards at least two TRP directions is determined based on the TPMI indication information.

In the embodiment of the present disclosure, the precoding of the PUSCH is determined through TPMI information in a TPMI domain, while the TPMI indication information is used to indicate that the terminal indicates the precoding matrix through the TPMI domain.

In some embodiments, after determining the precoding used when transmitting the PUSCH, the transmission beam of the PUSCH is determined based on the precoding for transmission.

In some embodiments, the uplink transmission scheme of PUSCH includes codebook-based uplink transmission and non-codebook based uplink transmission. As for PUSCH transmission for different TRPs, the direction information can be indicated through the SRI domain in DCI signaling, and the specific precoding is indicated respectively using the TPMI domain.

Currently, the time division multiplexing (TDM) repetition modes of PUSCH mainly include PUSCH repetition type A and PUSCH repetition type B. Explanations are provided separately for repetition type A and repetition type B.

Figure 3:
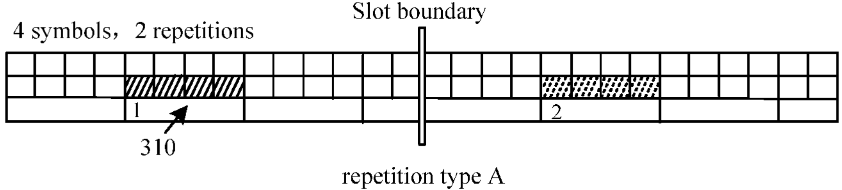
FIG. 3 is a schematic diagram of repetition type A of PUSCH provided by an example embodiment of the present disclosure.

Repetition type A: repeated transmission between time slots is configured through RRC signaling, and the same transport block (TB) is repeatedly transmitted on a plurality of transmission opportunities (nominal repetition). The transmission opportunity refers to the continuous time domain resources for transmitting PUSCH in the time domain. In transmission type A, one transmission opportunity is in one time slot, and different transmission opportunities are in different time slots. Transmission type A is mainly used at the cell edge, so the number of transmission layers is also limited to single-sided transmission. One PUSCH is transmitted in K consecutive time slots, that is, K transmission opportunities. The transmission starts on the S-th symbol in the starting time slot. Each transmission opportunity lasts for L symbols, and S+L does not exceed the slot boundary. For example, please refer to FIG. 3, which shows a schematic diagram of repetition type A of PUSCH. As shown in FIG. 3, during the transmission process of the PUSCH channel 310, the terminal device performs first repeated transmission from the 4th symbol to the 7th symbol of the first time slot, and performs second repeated transmission from the 4th symbol to the 7th symbol of the second time slot. One time slot includes 14 symbols, which are the 0th symbol to the 13th symbol respectively.

Repetition type B: transmission type B can realize back to back continuous transmission of the same TB and can cross the time slot boundaries. This transmission type has no limit on the number of transmission layers and can support data uplink transmission of 1-4 layers. In the time domain, one PUSCH starts transmission on the S-th symbol in the starting slot, and continuously transmits K transmission opportunities. Each transmission opportunity occupies L symbols continuously (back-to-back), transmitting S+L can cross slot boundaries. That is, in transmission type B, one time slot may include one or more transmission opportunities.

Figure 4:
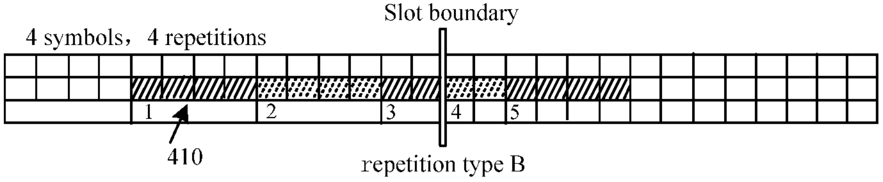
FIG. 4 is a schematic diagram of repetition type B of PUSCH provided by an example embodiment of the present disclosure.

For example, FIG. 4 shows a schematic diagram of repetition type B of PUSCH. As shown in FIG. 4, for example, one PUSCH starts transmission on the 4th symbol in the starting slot, transmits 4 transmission opportunities continuously, and each transmission opportunity continuously occupies 4 symbols. FIG. 4 shows transmission of PUSCH channel 410.

For PUSCH based on multi-TRP transmission, the terminal further obtains spatial diversity gain and improves transmission reliability by jointly transmitting the unified TB of PUSCH in different TRPs. For different transmission opportunities, the transmissions corresponding to different beam directions can be mapped. Specifically, repeated transmissions of the plurality of TBs can be mapped to K specific transmission opportunities through the following plurality of possible mapping rules. Therefore, the transmission opportunities corresponding to beam transmission in different TRPs are divided into two groups. Taking K=8 as an example, cyclic mapping is for example 12121212; sequential mapping is for example 11221122; and half-half mapping is for example 11112222.

Optionally, the terminal determines the PUSCH transmission scheme according to the configured TPMI indication information. The PUSCH transmission scheme includes at least one of the following situations.

First, the precoding indicated by the TPMI information in the TPMI domain is applied to all transmission opportunities of the PUSCH.

Optionally, regardless of whether the current transmission configuration is multi-TRP transmission, only the precoding corresponding to the TPMI information indicated by the network in the first TPMI domain is used for transmission of the PUSCH, and is applied to all transmission opportunities of PUSCH. That is, for PUSCH transmission towards one TRP direction or PUSCH transmission towards a plurality of TRP directions, only the precoding corresponding to the TPMI information indicated by the network in the first TPMI domain is used.

Second, the precoding indicated by the TPMI information in the TPMI domain is applied to a first transmission opportunity of the PUSCH.

That is, the TPMI information indicated by the network in the first TPMI domain is used, and the TPMI information is only used for the first transmission opportunity, and subsequent transmission opportunities can use the same precoding or different precodings. Optionally, a precoding preconfigured by a network is applied to an n-th transmission opportunity of the PUSCH, n>1, and n is an integer, different transmission opportunities use the same precoding or different precodings.

Alternatively, a predefined precoding is applied to an n-th transmission opportunity of the PUSCH, n>1, and n is an integer, different transmission opportunities use the same precoding or different precodings.

In some embodiments, a group of precodings associated with the TPMI information in the TPMI domain and determined to be used by the terminal based on known information is applied to PUSCH transmission opportunities after the first transmission opportunity, different transmission opportunities use the same precoding or different precodings.

Third, the precoding indicated by the TPMI information in the TPMI domain is applied to respective first transmission opportunities in transmission opportunity groups corresponding to transmitting the PUSCH in each TRP direction.

In some embodiments, other transmission opportunities except the first transmission opportunity use the same precoding or different precodings.

In some embodiments, when a SRS resource set is configured as at least one and at least one SRI indication domain exists, the PUSCH is transmitted by using the precoding indicated by the TPMI domain in a beam direction corresponding to SRS resource indicated in each SRI domain respectively; or when a SRS resource set is configured as at least one but no corresponding SRI indication domain exists, the PUSCH is transmitted by using the precoding indicated by the TPMI domain in a beam direction corresponding to SRS resource contained in each SRS resource set respectively.

To sum up, the uplink transmission method provided by the embodiments of the present disclosure considers a configurable uplink transmission solution in uplink PUSCH transmission, the overhead of DCI signaling caused by TPMI is reduced by using a macrodiversity manner, and the robustness during uplink repeated transmission is enhanced.

Figure 5:
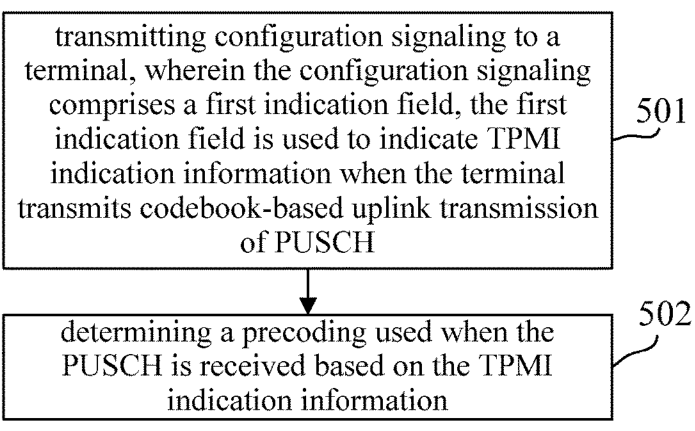
FIG. 5 shows a flow chart of an uplink transmission method provided by another example embodiment of the present disclosure.

FIG. 5 is a flow chart of an uplink transmission method provided by an example embodiment of the present disclosure. For example, the method is applied to a network device. As shown in FIG. 5, the method includes following steps.

Step 501, configuration signaling is transmitted to a terminal, wherein the configuration signaling includes a first indication field, the first indication field indicates TPMI indication information while the terminal transmits codebook-based uplink transmission of PUSCH.

In some embodiments, the configuration signaling is directly configured by the network device to the terminal. That is, regardless of whether the terminal has the UE capability to support the second TPMI domain, the network device can transmit configuration information to the terminal, and the terminal is configured to determine to transmit precoding through the configured TPMI domain when transmitting based on the codebook.

Alternatively, after receiving the UE capabilities reported by the terminal device, the network device transmits the configuration signaling to the terminal according to the UE capabilities. That is, the network device receives UE capability related information transmitted by the terminal. The UE capability related information is used to indicate whether the terminal supports an ability to configure a second TPMI indication domain in downlink control information (DCI) while the terminal supports cooperation of at least two TRPs to transmit the PUSCH.

Step 502, a precoding used while the PUSCH is received is determined based on the TPMI indication information.

In some embodiments, the TPMI indication information is configured to be applied to the precoding used while the PUSCH is received towards a TRP direction; or, the TPMI indication information is configured to be applied to the precoding used while the PUSCH is received towards at least two TRP directions.

Optionally, the precoding indicated by the TPMI information in the TPMI domain is configured to be applied to all transmission opportunities of the PUSCH.

Alternatively, the precoding indicated by the TPMI information in the TPMI domain is configured to be applied to a first transmission opportunity of the PUSCH, and other transmission opportunities except the first transmission opportunity use the preconfigured precoding or predefined precoding. That is, in the case of preconfiguration: configuration information is transmitted to the terminal, wherein the configuration information is used to configure a precoding applied to an n-th transmission opportunity of the PUSCH to the terminal, n>1, and n being an integer, wherein different transmission opportunities use the same precoding or different precodings; in the case of predefinition: the precoding applied to an n-th transmission opportunity of the PUSCH is predefined, n>1, and n being an integer, wherein different transmission opportunities use the same precoding or different precodings.

Alternatively, the precoding indicated by the TPMI information in the TPMI domain is configured to be applied to respective first transmission opportunities in transmission opportunity groups corresponding to receiving the PUSCH in each TRP direction. Other transmission opportunities except the first transmission opportunity use the same precoding or different precodings.

To sum up, the uplink transmission method provided by the embodiments of the present disclosure considers a configurable uplink transmission solution in uplink PUSCH transmission, the overhead of DCI signaling caused by TPMI is reduced by using a macrodiversity manner, and the robustness during uplink repeated transmission is enhanced.

Figure 6:
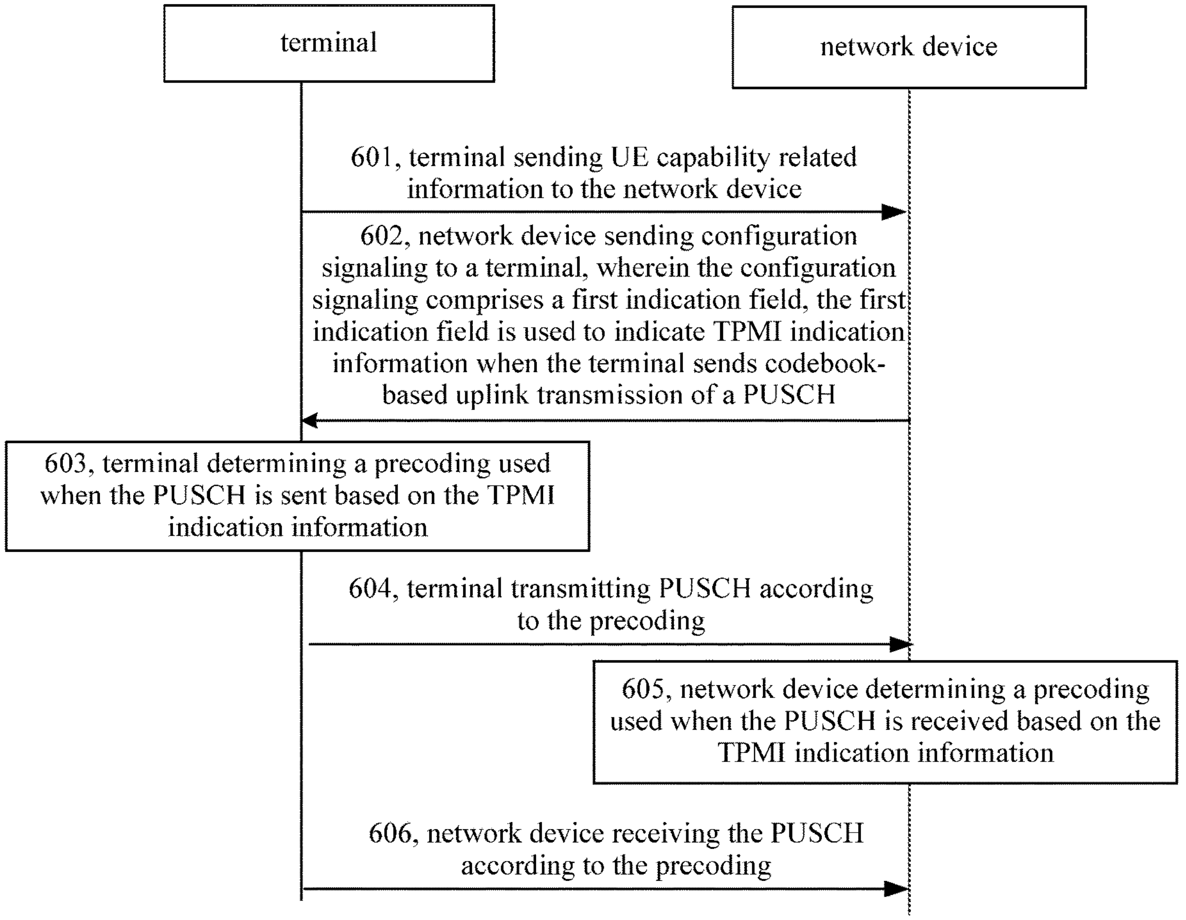
FIG. 6 shows a flow chart of an uplink transmission method provided by another example embodiment of the present disclosure.

FIG. 6 is a flow chart of an uplink transmission method provided by an example embodiment of the present disclosure. For example, the method is applied to a communication system. As shown in FIG. 6, the method includes following steps.

Step 601, the terminal transmits UE capability related information to the network device.

The UE capability related information is used to indicate whether the terminal supports an ability to configure a second TPMI indication domain in downlink control information (DCI) while the terminal supports cooperation of at least two TRPs to transmit the PUSCH.

Step 602, the network device transmits configuration signaling to a terminal, wherein the configuration signaling includes a first indication field, the first indication field indicates TPMI indication information while the terminal transmits codebook-based uplink transmission of a PUSCH.

In some embodiments, only the first indication field is included in the configuration signaling.

In some embodiments, the configuration signaling includes any one of physical layer signaling, RRC signaling, and MAC CE. In this embodiment, the configuration signaling is implemented as RRC signaling as an example for description.

Optionally, the first indication field indicates TPMI indication information while the terminal transmits codebook-based uplink transmission of PUSCH in one or at least two TRPs. In some embodiments, the TPMI indication information is used to indicate that the terminal does not have the ability to configure the second TPMI domain during codebook-based uplink transmission.

Step 603, the terminal determines a precoding used while the PUSCH is transmitted based on the TPMI indication information.

In some embodiments, the precoding used while the PUSCH is transmitted towards a TRP direction is determined based on the TPMI indication information; or, the precoding used while the PUSCH is transmitted towards at least two TRP directions is determined based on the TPMI indication information.

In the embodiment of the present disclosure, the precoding of the PUSCH is determined through TPMI information in a TPMI domain, while the TPMI indication information is used to indicate that the terminal indicates the precoding matrix through the TPMI domain.

In some embodiments, the uplink transmission scheme of PUSCH includes codebook-based uplink transmission and non-codebook based uplink transmission. As for PUSCH transmission in different TRPs, the direction information can be indicated through the SRI domain in DCI signaling, and the specific precoding is indicated respectively using the TPMI domain.

Step 604, the terminal transmits PUSCH according to the precoding.

In some embodiments, after determining the precoding used while the PUSCH is transmitted, the transmission beam of the PUSCH is determined according to the precoding for transmission.

Step 605, the network device determines a precoding used while the PUSCH is received based on the TPMI indication information.

Optionally, the precoding indicated by the TPMI information in the TPMI domain is applied to all transmission opportunities of the PUSCH.

Alternatively, the precoding indicated by the TPMI information in the TPMI domain is applied to a first transmission opportunity of the PUSCH, and other transmission opportunities except the first transmission opportunity use the preconfigured precoding or predefined precoding. That is, in the case of preconfiguration: configuration information is transmitted to the terminal, wherein the configuration information is used to configure a precoding applied to an n-th transmission opportunity of the PUSCH to the terminal, n>1, and n being an integer, wherein different transmission opportunities use the same precoding or different precodings; in the case of predefinition: the predefined precoding is applied to an n-th transmission opportunity of the PUSCH, n>1, and n being an integer, wherein different transmission opportunities use the same precoding or different precodings.

Alternatively, the precoding indicated by the TPMI information in the TPMI domain is applied to respective first transmission opportunities in transmission opportunity groups corresponding to receiving the PUSCH in each TRP direction. Other transmission opportunities except the first transmission opportunity use the same precoding or different precodings.

Step 606, the network device receives the PUSCH according to the precoding.

To sum up, the uplink transmission method provided by the embodiments of the present disclosure considers a configurable uplink transmission solution in uplink PUSCH transmission, the overhead of DCI signaling caused by TPMI is reduced by using a macrodiversity manner, and the robustness during uplink repeated transmission is enhanced.

FIG. 7 is a structural block diagram of an uplink transmission apparatus provided by an example embodiment of the present disclosure. As shown in FIG. 7, the apparatus is used in a terminal. The apparatus includes:

a receiving module 710, configured to receive configuration signaling, wherein the configuration signaling includes a first indication field, the first indication field indicates precoding matrix indicator (TPMI indication information) while the terminal transmits codebook-based uplink transmission of a physical uplink shared channel (PUSCH); and a processing module 720, configured to determine a precoding used while the PUSCH is transmitted, based on the TPMI indication information.

In an optional embodiment, the processing module 720 is further configured to determine the precoding used while the PUSCH is transmitted towards a TRP direction based on the TPMI indication information;

or, the processing module 720 is further configured to determine the precoding used while the PUSCH is transmitted towards at least two TRP directions based on the TPMI indication information.

In an optional embodiment, the processing module 720 is further configured to determine the precoding of the PUSCH through TPMI information in a TPMI domain, while the TPMI indication information is used to indicate that the terminal indicates the precoding matrix through the TPMI domain.

In an optional embodiment, the processing module 720 is further configured to apply the precoding indicated by the TPMI information in the TPMI domain to all transmission opportunities of the PUSCH.

In an optional embodiment, the processing module 720 is further configured to apply the precoding indicated by the TPMI information in the TPMI domain to a first transmission opportunity of the PUSCH.

In an optional embodiment, the processing module 720 is further configured to apply a precoding preconfigured by a network to an n-th transmission opportunity of the PUSCH, n>1, and n being an integer, wherein different transmission opportunities use the same precoding or different precodings;

or, the processing module 720 is further configured to apply a predefined precoding to an n-th transmission opportunity of the PUSCH, n>1, and n being an integer, wherein different transmission opportunities use the same precoding or different precodings.

In an optional embodiment, the processing module 720 is further configured to apply a group of precodings associated with the TPMI information in the TPMI domain and determined to be used by the terminal based on known information to PUSCH transmission opportunities after the first transmission opportunity, wherein different transmission opportunities use the same precoding or different precodings.

In an optional embodiment, the processing module 720 is further configured to apply the precoding indicated by the TPMI information in the TPMI domain to respective first transmission opportunities in transmission opportunity groups corresponding to transmitting the PUSCH in each TRP direction.

In an optional embodiment, other transmission opportunities except the first transmission opportunity use the same precoding or different precodings.

In an optional embodiment, while a sounding reference signal (SRS) resource set is configured as at least one and at least one SRS resource indication (SRI) domain exists, the PUSCH is transmitted by using the precoding indicated by the TPMI domain in a beam direction corresponding to SRS resource indicated in each SRI domain respectively.

In an optional embodiment, while a sounding reference signal (SRS) resource set is configured as at least one but no corresponding SRI indication domain exists, the PUSCH is transmitted by using the precoding indicated by the TPMI domain in a beam direction corresponding to SRS resource contained in each SRS resource set respectively.

In an optional embodiment, the apparatus further includes:

a transmitting module 730, configured to transmit UE capability related information to a network, wherein the UE capability related information is used to indicate whether the terminal supports an ability to configure a second TPMI indication domain in downlink control information (DCI) while the terminal supports cooperation of at least two TRPs to transmit the PUSCH.

FIG. 8 is a structural block diagram of an uplink transmission apparatus provided by an example embodiment of the present disclosure. As shown in FIG. 8, this apparatus is applied to the network device. The apparatus includes:

a transmitting module 810, configured to transmit configuration signaling to a terminal, wherein the configuration signaling includes a first indication field, the first indication field indicates precoding matrix indicator (TPMI indication information) while the terminal transmits codebook-based uplink transmission of a physical uplink shared channel (PUSCH); and a processing module 820, configured to determine a precoding used while the PUSCH is received, based on the TPMI indication information.

In an optional embodiment, the processing module 820 is further configured to determine the precoding used while the PUSCH is received towards a TRP direction based on the TPMI indication information;

or, the processing module 820 is further configured to determine the precoding used while the PUSCH is received towards at least two TRP directions based on the TPMI indication information.

In an optional embodiment, the processing module 820 is further configured to apply the precoding indicated by the TPMI information in the TPMI domain to all transmission opportunities of the PUSCH.

In an optional embodiment, the processing module 820 is further configured to apply the precoding indicated by the TPMI information in the TPMI domain to a first transmission opportunity of the PUSCH.

In an optional embodiment, the transmitting module 810 is further configured to transmit configuration information to the terminal, wherein the configuration information is used to configure a precoding applied to an n-th transmission opportunity of the PUSCH to the terminal, n>1, and n being an integer, wherein different transmission opportunities use the same precoding or different precodings;

or, the processing module 820 is further configured to apply the predefined precoding to an n-th transmission opportunity of the PUSCH, n>1, and n being an integer, wherein different transmission opportunities use the same precoding or different precodings.

In an optional embodiment, the processing module 820 is further configured to apply the precoding indicated by the TPMI information in the TPMI domain to respective first transmission opportunities in transmission opportunity groups corresponding to receiving the PUSCH in each TRP direction.

In an optional embodiment, other transmission opportunities except the first transmission opportunity use the same precoding or different precodings.

In an optional embodiment, the apparatus further includes:

a receiving module 830, configured to receive UE capability related information transmitted by the terminal, wherein the UE capability related information is used to indicate whether the terminal supports an ability to configure a second TPMI indication domain in downlink control information (DCI) while the terminal supports cooperation of at least two TRPs to transmit the PUSCH.

To sum up, the uplink transmission apparatus provided by the embodiments of the present disclosure considers a configurable uplink transmission solution in uplink PUSCH transmission, the overhead of DCI signaling caused by TPMI is reduced by using a macrodiversity manner, and the robustness during uplink repeated transmission is enhanced.

FIG. 9 shows a schematic structural diagram of a communication device 900 (terminal device or network device) provided by an example embodiment of the present disclosure. The communication device 900 includes: a processor 901, a receiver 902, a transmitter 903, a memory 904 and a bus 905.

The processor 901 includes one or more processing cores. The processor 901 executes various functional applications and information processing by running software programs and modules.

The receiver 902 and the transmitter 903 can be implemented as a communication component, and the communication component can be a communication chip.

The memory 904 is connected to the processor 901 through a bus 905.

The memory 904 can be used to store at least one instruction, and the processor 901 is used to execute the at least one instruction to implement each step in the above method embodiment.

Additionally, the memory 904 may be implemented by any type of volatile or non-volatile storage device, or combination thereof, including but not limited to: magnetic or optical disks, Erasable Programmable Read Only Memory (EEPROM), Erasable Programmable Read Only Memory (EPROM), Static Random Access Memory (SRAM), Read-Only Memory (ROM), magnetic memory, flash memory, Programmable Read-Only Memory (PROM).

An example embodiment of the present disclosure also provides an uplink transmission system, where the system includes: a terminal device and a network device;

the terminal device includes the uplink transmission apparatus provided by the embodiment as shown in FIG. 7;

the network device includes the uplink transmission apparatus provided in the embodiment shown in FIG. 8.

An example embodiment of the present disclosure also provides a non-transient computer-readable storage medium. The non-transient computer-readable storage medium stores at least one instruction, at least a program, a code set or an instruction set. The at least one instruction, the at least one program, the code set or the instruction set is loaded and executed by the processor to implement the steps performed by the terminal in the uplink transmission method provided by each of the above method embodiments.

It should be understood that "plurality" mentioned in this description means two or more. "And/or" describes the relationship between related objects, indicating that there can be three relationships. For example, A and/or B can mean: A exists alone, A and B exist simultaneously, and B exists alone. The character "/" generally indicates that the related objects are in an "or" relationship.

Other embodiments of the present disclosure will readily come to the mind of those skilled in the art after considering the specification and practicing the disclosure disclosed herein. This application is intended to cover any variations, uses, or adaptations of the present disclosure that follow the general principles of the present disclosure and include commonly known or customary technical means in the art that are not disclosed herein. The specification and embodiments are to be considered exemplary only, and the true scope and spirit of the present disclosure is indicated by the appended claims.

It is to be understood that the present disclosure is not limited to the precise structures described above and illustrated in the accompanying drawings, and various modifications and changes may be made without departing from the scope thereof. The scope of the disclosure is limited only by the appended claims.

What is claimed is:

1. An uplink transmission method, performed by a terminal, the method comprising:

receiving configuration signaling, wherein the configuration signaling comprises a first indication field, the first indication field indicates precoding matrix indicator (TPMI indication information) while the terminal transmits codebook-based uplink transmission of a physical uplink shared channel (PUSCH); and determining a precoding used while the PUSCH is transmitted, based on the TPMI indication information, wherein, while a sounding reference signal (SRS) resource set is configured as at least one but no corresponding SRI indication domain exists, the PUSCH is transmitted by using the precoding indicated by the TPMI domain in a beam direction corresponding to SRS resource contained in each SRS resource set respectively.

2. The method according to claim 1, further comprising:

determining the precoding used while the PUSCH is transmitted towards a TRP direction based on the TPMI indication information;

or, determining the precoding used while the PUSCH is transmitted towards at least two TRP directions based on the TPMI indication information.

3. The method according to claim 1, wherein determining a precoding used while the PUSCH is transmitted, based on the TPMI indication information comprises:

determining the precoding of the PUSCH through TPMI information in a TPMI domain, while the TPMI indication information is configured to indicate that the terminal indicates the precoding matrix through the TPMI domain.

4. The method according to claim 3, further comprising:

applying the precoding indicated by the TPMI information in the TPMI domain to all transmission opportunities of the PUSCH.

5. The method according to claim 3, further comprising:

applying the precoding indicated by the TPMI information in the TPMI domain to a first transmission opportunity of the PUSCH.

6. The method according to claim 5, further comprising:

applying a precoding preconfigured by a network to an n-th transmission opportunity of the PUSCH, n>1, and n being an integer, wherein different transmission opportunities use the same precoding or different precodings;

or, applying a predefined precoding to an n-th transmission opportunity of the PUSCH, n>1, and n being an integer, wherein different transmission opportunities use the same precoding or different precodings.

7. The method according to claim 5, further comprising: applying a group of precodings associated with the TPMI information in the TPMI domain and determined to be used by the terminal based on known information to PUSCH transmission opportunities after the first transmission opportunity, wherein different transmission opportunities use the same precoding or different precodings.

8. The method according to claim 3, wherein determining the precoding of the PUSCH through the TPMI information in a TPMI domain comprises:

applying the precoding indicated by the TPMI information in the TPMI domain to respective first transmission opportunities in transmission opportunity groups corresponding to transmitting the PUSCH in each TRP direction.

9. The method according to claim 8, wherein other transmission opportunities except the first transmission opportunity use the same precoding or different precodings.

10. The method according to claim 1, wherein while a sounding reference signal (SRS) resource set is configured as at least one and at least one SRS resource indication (SRI) domain exists, the PUSCH is transmitted by using the precoding indicated by the TPMI domain in a beam direction corresponding to SRS resource indicated in each SRI domain respectively.

11. A non-transient computer-readable storage medium, having at least one instruction, at least one program, code set or instruction set stored therein, wherein the at least one instruction, at least one program, code set or instruction set is loaded and executed by a processor to implement the uplink transmission method according to claim 1.

12. An uplink transmission method, performed by a network device, the method comprising:

transmitting configuration signaling to a terminal, wherein the configuration signaling comprises a first indication field, the first indication field indicates precoding matrix indicator (TPMI indication information) while the terminal transmits codebook-based uplink transmission of a physical uplink shared channel (PUSCH); and determining a precoding used while the PUSCH is received, based on the TPMI indication information, wherein, while a sounding reference signal (SRS) resource set is configured as at least one but no corresponding SRI indication domain exists, the network device expects the terminal to transmit the PUSCH by using the precoding indicated by the TPMI domain in a beam direction corresponding to SRS resource contained in each SRS resource set respectively.

13. The method according to claim 12, further comprising:

configuring the TPMI indication information to be applied to the precoding used while the PUSCH is received towards a TRP direction;

or, configuring the TPMI indication information to be applied to the precoding used while the PUSCH is received towards at least two TRP directions.

14. The method according to claim 13, further comprising:

configuring the precoding indicated by the TPMI information in the TPMI domain to be applied to all transmission opportunities of the PUSCH.

15. The method according to claim 13, further comprising:

configuring the precoding indicated by the TPMI information in the TPMI domain to be applied to a first transmission opportunity of the PUSCH.

16. The method according to claim 15, further comprising:

transmitting configuration information to the terminal, wherein the configuration information configures a precoding applied to an n-th transmission opportunity of the PUSCH to the terminal, n>1, and n being an integer, wherein different transmission opportunities use the same precoding or different precodings;

or, predefining the precoding applied to an n-th transmission opportunity of the PUSCH, n>1, and n being an integer, wherein different transmission opportunities use the same precoding or different precodings.

17. The method according to claim 13, wherein determining the precoding of the PUSCH through the TPMI information in a TPMI domain comprises:

configuring the precoding indicated by the TPMI information in the TPMI domain to be applied to respective first transmission opportunities in transmission opportunity groups corresponding to receiving the PUSCH in each TRP direction.

18. A network device, comprising:

a processor; and a transceiver, connected with the processor, wherein, the processor is configured to load and execute executable instructions to implement the uplink transmission method according to claim 12.

19. A terminal, comprising:

a processor; and a transceiver, connected with the processor, wherein, the processor is configured to load and execute executable instructions to implement a uplink transmission method, the method is applied to a terminal and comprises:

receiving configuration signaling, wherein the configuration signaling comprises a first indication field, the first indication field indicates precoding matrix indicator (TPMI indication information) while the terminal transmits codebook-based uplink transmission of a physical uplink shared channel (PUSCH); and determining a precoding used while the PUSCH is transmitted, based on the TPMI indication information, wherein, while a sounding reference signal (SRS) resource set is configured as at least one but no corresponding SRI indication domain exists, the PUSCH is transmitted by using the precoding indicated by the TPMI domain in a beam direction corresponding to SRS resource contained in each SRS resource set respectively.

* * * * *